(12) United States Patent
Hisano et al.

(10) Patent No.: US 11,146,869 B2
(45) Date of Patent: Oct. 12, 2021

(54) BANDWIDTH ALLOCATION APPARATUS AND BANDWIDTH ALLOCATION METHOD

(71) Applicant: Nippon Telegraph and Telephone Corporation, Tokyo (JP)

(72) Inventors: Daisuke Hisano, Musashino (JP); Hiroyuki Uzawa, Musashino (JP); Rintaro Harada, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 16/970,986

(22) PCT Filed: Feb. 28, 2019

(86) PCT No.: PCT/JP2019/007790
§ 371 (c)(1),
(2) Date: Aug. 19, 2020

(87) PCT Pub. No.: WO2019/176559
PCT Pub. Date: Sep. 19, 2019

(65) Prior Publication Data
US 2020/0404401 A1 Dec. 24, 2020

(30) Foreign Application Priority Data
Mar. 13, 2018 (JP) .............................. JP2018-045825

(51) Int. Cl.
*H04Q 11/00* (2006.01)
(52) U.S. Cl.
CPC ..... *H04Q 11/0067* (2013.01); *H04Q 11/0066* (2013.01); *H04Q 2011/0064* (2013.01); *H04Q 2011/0086* (2013.01)
(58) Field of Classification Search
CPC combination set(s) only.
See application file for complete search history.

(56) References Cited

U.S. PATENT DOCUMENTS 5,655,140 A * 8/1997 Haddock ............. H04L 12/4625
709/246
6,778,557 B1 8/2004 Yuki et al.
(Continued)

FOREIGN PATENT DOCUMENTS

JP 2011-083029 4/2011
WO WO 2014/077168 5/2014

OTHER PUBLICATIONS

Hisano et al., "Experimental demonstration of accommodations of TDD-based mobile fronthaul and secondary service in a TDM-PON," IEICE Technical Report, 2017, 117(156):59-64 (English Abstract).

(Continued)

*Primary Examiner* — Omar S Ismail
(74) *Attorney, Agent, or Firm* — Fish & Richardson P.C.

(57) ABSTRACT

A bandwidth allocation apparatus includes a request information acquisition unit configured to acquire request information indicating a required amount for a bandwidth allocation by using a communication link separated from a data link used in data communication, a determination unit configured to determine, on the basis of the request information, whether the bandwidth allocation that allows transmission of data within the designated time, to a termination apparatus is possible, and a bandwidth-allocation amount definition unit configured to, in a case where the bandwidth allocation to the termination apparatus is determined not to be possible, specify some termination apparatuses to which the bandwidth allocation that allows transmission of data within the designated time, is possible, define a bandwidth allocation amount for a specified termination apparatus, and allocate the defined bandwidth allocation amount to the specified termination apparatus.

16 Claims, 10 Drawing Sheets

(56) References Cited

U.S. PATENT DOCUMENTS

| | | | | |
|---|---|---|---|---|
| 6,963,547 B1* | 11/2005 | Kwak | H04L 1/0041 | 370/310.1 |
| 7,573,897 B2* | 8/2009 | Elmoalem | H04J 3/1694 | 370/458 |
| 2003/0179769 A1* | 9/2003 | Shi | H04J 3/1694 | 370/442 |
| 2007/0110099 A1* | 5/2007 | Ozaki | H04Q 11/0067 | 370/468 |
| 2008/0279554 A1* | 11/2008 | Kazawa | H04J 3/1694 | 398/69 |
| 2009/0162064 A1* | 6/2009 | Mizutani | H04J 14/0247 | 398/66 |
| 2009/0162065 A1* | 6/2009 | Mizutani | H04J 3/0655 | 398/66 |
| 2010/0067913 A1* | 3/2010 | Niibe | H04Q 11/0067 | 398/98 |
| 2011/0091211 A1* | 4/2011 | Kazawa | H04J 3/1694 | 398/63 |
| 2011/0142448 A1* | 6/2011 | Zou | H04J 14/0201 | 398/58 |
| 2012/0093500 A1* | 4/2012 | Shiba | H04J 14/0247 | 398/25 |
| 2012/0121265 A1* | 5/2012 | Suvakovic | H04B 10/272 | 398/66 |
| 2013/0177314 A1* | 7/2013 | Mizuguchi | H04J 3/0655 | 398/66 |
| 2013/0272699 A1* | 10/2013 | Liang | H04J 3/0682 | 398/45 |
| 2014/0161456 A1* | 6/2014 | Sugawa | H04J 14/0246 | 398/72 |
| 2015/0195039 A1* | 7/2015 | Chu | H04Q 11/0071 | 398/66 |
| 2015/0311980 A1 | 10/2015 | Kuwano et al. | | |
| 2017/0223712 A1* | 8/2017 | Stephens | H04W 72/0446 | |
| 2018/0270722 A1* | 9/2018 | Kim | H04W 36/0072 | |
| 2018/0332373 A1* | 11/2018 | Wey | H04Q 11/0062 | |

OTHER PUBLICATIONS

PCT International Search Report in International Appln No. PCT/JP2019/007790, dated Apr. 16, 2019, 7 pages (with English Translation).

* cited by examiner

BANDWIDTH ALLOCATION APPARATUS AND BANDWIDTH ALLOCATION METHOD

CROSS-REFERENCE TO RELATED APPLICATIONS

This application is a National Stage application under 35 U.S.C. § 371 of International Application No. PCT/JP2019/007790, having an International Filing Date of Feb. 28, 2019, which claims priority to Japanese Application Serial No. 2018-045825, filed on Mar. 13, 2018. The disclosure of the prior application is considered part of the disclosure of this application, and is incorporated in its entirety into this application.

TECHNICAL FIELD

This disclosure relates to a bandwidth allocation apparatus and a bandwidth allocation method.

BACKGROUND ART

In a system in which an antenna unit (DU: Distributed Unit) and a signal processing unit (CU: Central Unit) in a radio base station are separated, the antenna unit and the signal processing unit are connected through an optical device and an optical fiber. An optical section in which the antenna unit and the signal processing unit are connected is referred to as a mobile fronthaul. In recent years, networking of the mobile fronthaul has been examined in order to economically construct the mobile fronthaul. In particular, application of a Time Division Multiplexed Passive Optical Network (TDM-PON) to the mobile fronthaul has been widely examined.

FIG. 9 is a diagram illustrating an example of a configuration of a TDM-PON system. The TDM-PON system includes a subscriber line termination apparatus 300 (ONU: Optical Network Unit), a subscriber line end station apparatus 200 (OLT: Optical Line Terminal), an optical fiber, and an optical splitter. The subscriber line termination apparatus 300 is connected to a lower apparatus 400. The lower apparatus 400 is a DU, for example. The subscriber line end station apparatus 200 is connected to a higher apparatus 100. The higher apparatus 100 is a CU, for example. The optical splitter aggregates signals transmitted from the subscriber line termination apparatuses 300 and transmits the resultant of the aggregation to the subscriber line end station apparatus 200. The optical splitter distributes the signal transmitted from the subscriber line end station apparatus 200 to the subscriber line termination apparatuses 300. In a case where a TDM-PON is used for the mobile fronthaul, an uplink latency is a problem. Patent Literature 1 discloses a technology of minimizing the uplink latency. The method disclosed in Patent Literature 1 is a method of attempting a cooperative operation between the higher apparatus 100 and the subscriber line end station apparatus 200.

In the mobile fronthaul, a latency requirement is placed for the transmissions between the lower apparatus 400 and the higher apparatus 100. For example, according to Non-Patent Literature 3, transmission latency has to be within 250 µs. The transmission capacity C required to transmit burst traffic that arrives from the lower apparatuses 400 to the subscriber line termination apparatus 300 (i.e., the higher apparatus 100) within the latency requirement is represented by the mathematical relationship (1). Thpon in the mathematical relationship (1) indicates a transmission speed of a PON link. Ttti in the mathematical relationship (1) indicates a transmission period of a radio signal. Treq in the mathematical relationship (1) indicates a latency requirement.

[Math. 1]

$$C = \frac{T_{req}}{T_{tti}} Th_{pon} \quad (1)$$

CITATION LIST

Patent Literature

Patent Literature 1: WO 2014/0077168

SUMMARY OF THE INVENTION

Technical Problem

However, in a case where data exceeding the transmission capacity C is input, it is not possible to perform signal transmission within the latency requirement. For example, in a case where the transmission speed of the TDM-PON is 10 Gbps, the transmission period of a radio signal is 1 ms, and the latency requirement is 250 µs, the transmission capacity is 2.5 Gbps. Here, in FIG. 10, it is assumed that four lower apparatuses 400 are accommodated in the subscriber line termination apparatus 300 in the TDM-PON. In a case where the total transmission speed of an uplink signals transmitted from the lower apparatuses 400 to the subscriber line termination apparatus 300 exceed the transmission capacity 2.5 Gbps, uplink signals of all four lower apparatuses do not satisfy the latency requirement. In this case, the uplink signals of all four lower apparatuses are discarded by the higher apparatus 100.

Therefore, in a case where the total transmission speed of the uplink signals transmitted from the lower apparatuses 400 to the subscriber line termination apparatus 300 exceed the transmission capacity, it is not possible to perform signal transmission satisfying the latency requirement. Thus, the uplink signals transmitted from the lower apparatuses 400 are discarded by the higher apparatus 100.

Considering the things mentioned above, an object of this disclosure is to provide a technology for maximizing the number of termination apparatuses capable of transmitting data within a defined time.

Means for Solving the Problem

According to an aspect of this disclosure, a bandwidth allocation apparatus includes a request information acquisition unit configured to acquire request information indicating a required amount for a bandwidth allocation by using a communication link separated from a data link used in data communication, a determination unit configured to determine, on the basis of the request information, whether the bandwidth allocation that allows transmission of data within designated time to a termination apparatus is possible, and a bandwidth-allocation amount definition unit configured to, in a case where the bandwidth allocation to the termination apparatus is determined not to be possible, specify some termination apparatuses to which the bandwidth allocation that allows transmission of data within the designated time is possible, define a bandwidth allocation amount for a specified termination apparatus, and allocate the defined bandwidth allocation amount to the specified termination apparatus.

According to the aspect of this disclosure, the bandwidth allocation apparatus further includes a head position acquisition unit configured to acquire the head position information indicating time at which the first data of burst traffic is transmitted in an uplink signal transmitted from the termination apparatus to an end station apparatus. The bandwidth-allocation amount definition unit, on the basis of the request information and the head position information, defines bandwidth allocation time indicating time at which the bandwidth allocation amount is allocated and allocates the bandwidth allocation amount to the termination apparatus at the bandwidth allocation time.

According to the aspect of this disclosure, in the bandwidth allocation apparatus, in a case where it is determined that the bandwidth allocation to the termination apparatus is not possible, the bandwidth-allocation amount definition unit defines the bandwidth allocation amount to maximize the number of the termination apparatuses capable of transmitting data within the designated time.

According to the aspect of this disclosure, in the bandwidth allocation apparatus, in a case where it is determined that the bandwidth allocation to the termination apparatus is not possible, the bandwidth-allocation amount definition unit defines the bandwidth allocation amount to maximize the number of the termination apparatuses which include a termination apparatus designated in advance and are capable of transmitting data within the designated time.

According to the aspect of this disclosure, in the bandwidth allocation apparatus, the bandwidth-allocation amount definition unit defines, in an unused bandwidth, the bandwidth allocation amount to the termination apparatus not capable of transmitting data within the time. The unused bandwidth is obtained by removing, from an entire bandwidth, the bandwidth allocation amount to the termination apparatus capable of transmitting data within the time.

According to the aspect of this disclosure, the bandwidth allocation apparatus further includes a discard instruction unit configured to transmit a discard instruction, to the termination apparatus not capable of transmitting data within the time.

According to another aspect of this disclosure, a bandwidth allocation method of a bandwidth allocation apparatus includes, at the bandwidth allocation apparatus, acquiring request information indicating a required amount for a bandwidth allocation by using a communication link separated from a data link used in data communication, determining, on the basis of the request information, whether the bandwidth allocation that allows transmission of data within designated time, to a termination apparatus is possible, and, in a case where the bandwidth allocation to the termination apparatus is determined not to be possible, specifying some termination apparatuses to which bandwidth allocation that allows transmission of data within the designated time, is possible, defining a bandwidth allocation amount for a specified termination apparatus, and allocating the defined bandwidth allocation amount to the specified termination apparatus.

Effects of the Invention

With this disclosure, it is possible to maximize the number of termination apparatuses capable of transmitting data within defined time.

DESCRIPTION OF EMBODIMENTS

First Embodiment

Figure 1:
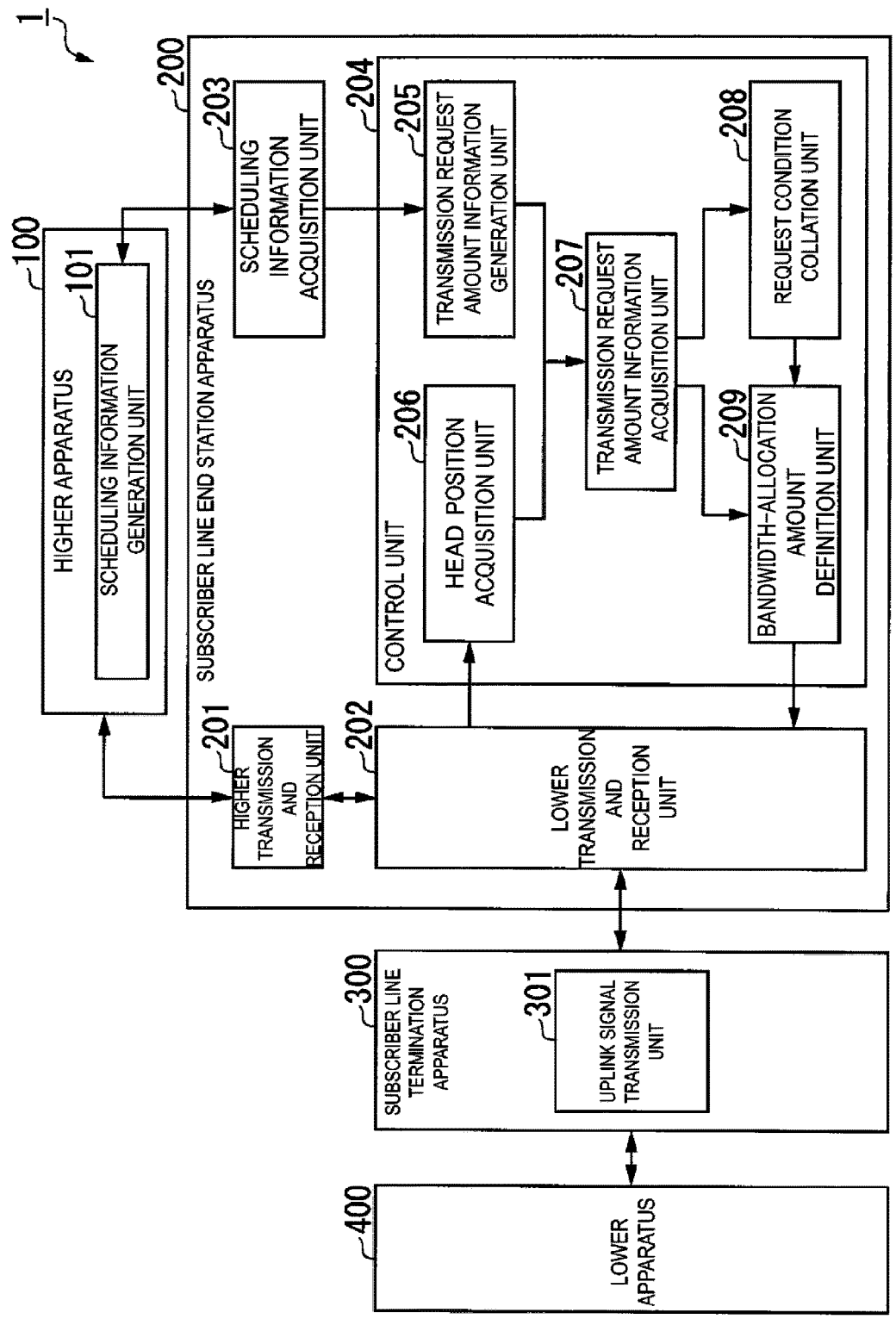
FIG. 1 is a system configuration diagram illustrating a system configuration of an optical communication system according to a first embodiment.

FIG. 1 is a system configuration diagram illustrating a system configuration of an optical communication system 1 according to a first embodiment. The optical communication system 1 includes a higher apparatus 100, a subscriber line end station apparatus 200, a subscriber line termination apparatus 300, and a lower apparatus 400. A TDM-PON is constructed between the higher apparatus 100 and the lower apparatus 400.

The higher apparatus 100 is a signal processing unit (CU) of a radio base station, for example. The higher apparatus 100 includes a Central Processing Unit (CPU), a memory, an auxiliary storage device, and the like, which are connected to each other by a bus. The higher apparatus 100 executes a bandwidth allocation program to function as an apparatus including a scheduling information generation unit 101. The higher apparatus 100 transmits a signal in a downlink (referred to as "a downlink signal" below) to a higher transmission and reception unit 201 of the subscriber line end station apparatus 200. The higher apparatus 100 transmits scheduling information to a scheduling information acquisition unit 203. In the scheduling information, transmission time and transmission data amount of a signal in an uplink (referred to as "an uplink signal" below) of User Equipment (UE) such as a mobile terminal (not illustrated) are scheduled.

The scheduling information generation unit 101 generates the scheduling information in which transmission time and transmission data amount of an uplink signal of the UE such as a mobile terminal (not illustrated) are scheduled. The transmission time is the time at which the uplink signal is transmitted. The transmission time indicates the time at which the UE such as a mobile terminal transmits an uplink signal. The transmission data amount indicates the data amount of a frame included in the uplink signal to be transmitted by the UE such as a mobile terminal. The transmission data amount indicates the data amount required by the subscriber line termination apparatus 300. The scheduling information is the information in which the transmission time and the transmission data amount are associated with each other. According to the scheduling information, it is possible to recognize when and how much the data is transmitted to the subscriber line end station apparatus 200.

The subscriber line end station apparatus 200 is an OLT. The subscriber line end station apparatus 200 is an apparatus that realizes a communication with another communication apparatus (for example, subscriber line termination apparatus 300) by an optical signal transmitted through an optical communication network. The optical communication network to which the subscriber line end station apparatus 200 is connected is a passive optical communication network such as a Passive Optical Network (PON), for example. The subscriber line end station apparatus 200 is installed, for example, in a central office connected to the optical communication network. The subscriber line end station apparatus 200 is one form of a bandwidth allocation apparatus.

The subscriber line end station apparatus 200 is implemented in a form of software in an information processing apparatus such as a server apparatus in a data center in a central office. Therefore, a portion or the entirety of each functional unit is realized, for example, by a processor such as CPU executing a program stored in a storage unit. The storage unit includes, for example, a non-volatile recording medium (non-transitory recording medium) such as a magnetic hard disk device or a semiconductor storage device. The subscriber line end station apparatus 200 includes a CPU, a memory, an auxiliary storage device, and the like connected by a bus. The subscriber line end station apparatus 200 executes a bandwidth allocation program to function as an apparatus including the higher transmission and reception unit 201, a lower transmission and reception unit 202, and a control unit 204.

The higher transmission and reception unit 201 is a network interface. The higher transmission and reception unit 201 communicates with the higher apparatus 100. The higher transmission and reception unit 201 may perform communication, for example, by an optical fiber, Long Term Evolution (LTE) (trade name), or the like.

The lower transmission and reception unit 202 is a network interface. The lower transmission and reception unit 202 communicates with the subscriber line termination apparatus 300. The lower transmission and reception unit 202 may perform communication, for example, by an optical fiber, LTE, or the like.

The scheduling information acquisition unit 203 is a network interface. The scheduling information acquisition unit 203 performs communication by using a link separated from a data link in which a main signal is transmitted and received. The scheduling information acquisition unit 203 acquires scheduling information received by the higher transmission and reception unit 201.

The scheduling information acquisition unit 203 outputs the scheduling information received from the higher apparatus 100 to a transmission request amount information generation unit 205. The scheduling information acquisition unit 203 is one form of a request information acquisition unit. The request information acquisition unit acquires request information indicating a required amount for bandwidth allocation, by using a communication link separated from a communication link used in data communication. The scheduling information is one form of the request information.

The control unit 204 controls an operation of each unit in the subscriber line end station apparatus 200. The control unit 204 is executed, for example, by an apparatus including a processor such as a CPU, and a RAM. The control unit 204 executes the bandwidth allocation program to function as the transmission request amount information generation unit 205, a head position acquisition unit 206, a transmission request amount information acquisition unit 207, a request condition collation unit 208, and a bandwidth-allocation amount definition unit 209.

The transmission request amount information generation unit 205 generates transmission request amount information by converting the received scheduling information into a format used in the transmission of the uplink signal in a TDM-PON. The transmission request amount information is the information obtained by converting the format of the scheduling information. The transmission request amount information includes the transmission time and the transmission data amount. The transmission request amount information generation unit 205 generates the transmission request amount information for each subscriber line termination apparatus 300. The transmission request amount information generation unit 205 outputs the generated transmission request amount information to the transmission request amount information acquisition unit 207. The transmission request amount information is used by the bandwidth-allocation amount definition unit 209 to define the bandwidth allocation amount in a relay section (for example, in the TDM-PON section) from the higher apparatus 100 to the lower apparatus 400. The subscriber line termination apparatus 300 transmits a frame corresponding to the allocated bandwidth allocation amount to the higher apparatus 100 by transmitting an uplink signal.

The head position acquisition unit 206 acquires the head position of burst traffic in an uplink of the mobile fronthaul, as head position information. The mobile fronthaul indicates an optical section in which the higher apparatus 100 and the lower apparatus 400 are connected to each other. The uplink indicates a path on a network from the subscriber line termination apparatus 300 to the subscriber line end station apparatus 200. Burst traffic means that the amount of data transmitted and received between the subscriber line termination apparatus 300 and the subscriber line end station apparatus 200 increases rapidly and temporarily. The head position acquisition unit 206 outputs the acquired head position information to the transmission request amount information acquisition unit 207.

Figure 2:
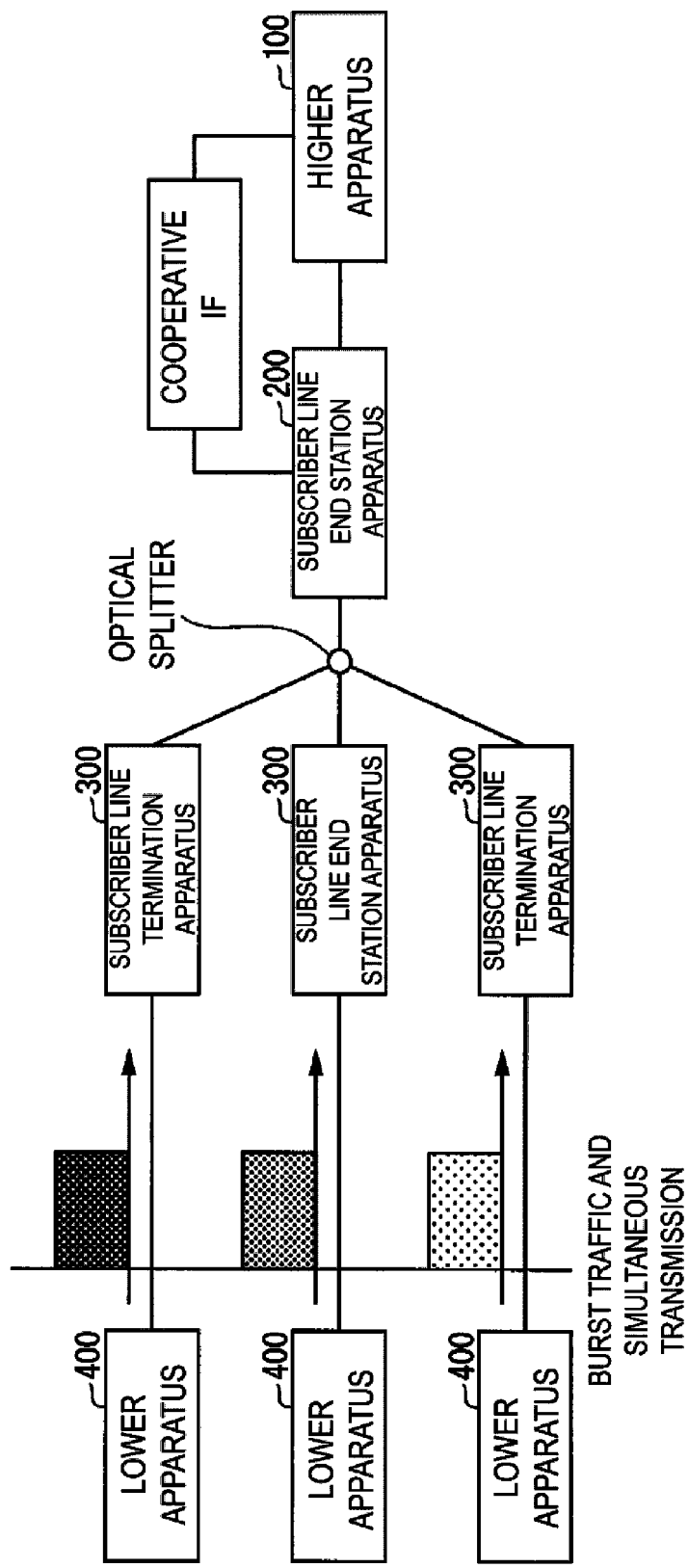
FIG. 2 is a diagram illustrating an example of burst traffic.

FIG. 2 is a diagram illustrating a specific example of the burst traffic. In the lower apparatus 400, demodulation or decoding processing of a radio signal is performed. Thus, the signal transmitted to the mobile fronthaul may cause burst traffic. In a case where a time division duplex scheme is performed, or a cooperative operation between lower apparatuses 400 is performed, the lower apparatus 400 synchronizes time between the lower apparatuses 400.

Thus, the lower apparatuses 400 simultaneously transmit uplink signals to the subscriber line termination apparatuses 300.

Returning to FIG. 1, the description of the optical communication system 1 resumes. The transmission request amount information acquisition unit 207 acquires the transmission request amount information from the transmission request amount information generation unit 205. In a case where the transmission request amount information acquisition unit 207 acquires the transmission request amount information, the transmission request amount information acquisition unit 207 acquires the head position information from the head position acquisition unit 206. The transmission request amount information acquisition unit 207 outputs the acquired transmission request amount information and the head position information to the request condition collation unit 208 and the bandwidth-allocation amount definition unit 209.

The request condition collation unit 208 acquires the transmission request amount information from the transmission request amount information acquisition unit 207. The request condition collation unit 208 defines the transmission request amount based on the transmission data amount included in the transmission request amount information. The request condition collation unit 208 determines whether the transmission request amount satisfies a predetermined condition. Specifically, the request condition collation unit 208 compares the latency requirement and the acquired transmission request amount to each other. The latency requirement refers to a time constraint of a transmission latency occurring in a case where an uplink signal is transmitted from the lower apparatus 400 to the higher apparatus 100 in the mobile fronthaul. For example, in Non-Patent Literature 3, transmission Latency has to be within 250 μs. The time constraint placed in such a transmission latency is referred to as the latency requirement. The latency requirement is not always 250 μs, and any value may be set so long as it is designated in advance. In the present embodiment, the latency requirement is defined as Treq. In the present embodiment, the latency requirement in a case where a unit of the latency requirement Treq is converted from time to bit is defined as Rreq.

The request condition collation unit 208 determines whether the bandwidth allocation is possible that data corresponding to the transmission request amount can be transmitted to the higher apparatus 100 within the time designated by the latency requirement. Specifically, the request condition collation unit 208 determines whether the mathematical relationship (2) is established.

[Math. 2]

$$\sum_{i=1}^{N_{onu}} r_i \geq R_{req} \tag{2}$$

Nonu indicates the number of subscriber line termination apparatuses 300 accommodated in the optical communication system 1.

ri indicates the transmission request amount. i indicates identification information for identifying the subscriber line termination apparatus 300. In a case where the mathematical relationship (2) is established, the request condition collation unit 208 determines that the latency requirement is satisfied. In a case where the mathematical relationship (2) is not established, the request condition collation unit 208 determines that the latency requirement is not satisfied.

The request condition collation unit 208 outputs the determination result to the bandwidth-allocation amount definition unit 209. The request condition collation unit 208 is a form of the determination unit. The determination unit determines, on the basis of the request information, whether bandwidth allocation to the termination apparatus is possible that data can be transmitted within the designated time.

The bandwidth-allocation amount definition unit 209 defines the bandwidth allocation start time for each subscriber line termination apparatus 300, on the basis of the acquired head position information and the transmission request amount information. The bandwidth allocation start time is the time at which the bandwidth allocation amount defined by the bandwidth-allocation amount definition unit 209 starts to be allocated to the subscriber line termination apparatus 300. The bandwidth-allocation amount definition unit 209 may acquire the next bandwidth allocation start time by acquiring new head position information, or may acquire the next bandwidth allocation start time by adding one radio period to the time included in the head position information.

The bandwidth-allocation amount definition unit 209 defines the bandwidth allocation amount for the subscriber line termination apparatus 300.

The bandwidth-allocation amount definition unit 209 defines the bandwidth allocation amount by processing described later, in response to the determination result received from the request condition collation unit 208.

In a case where it is determined that the latency requirement is satisfied, the bandwidth-allocation amount definition unit 209 defines the bandwidth allocation amount by the first bandwidth allocation processing. The first bandwidth allocation processing is performed, for example, as follows. The bandwidth-allocation amount definition unit 209 defines a bandwidth allocation amount bi on the basis of the mathematical relationship (3), ball indicates the entire bandwidth in the optical communication system 1.

[Math. 3]

$$b_i = \frac{r_i}{\sum_{k=1}^{N_{onu}} r_k} b_{all} \tag{3}$$

The bandwidth-allocation amount definition unit 209 divides the defined bandwidth allocation amount bi into M pieces. In a case where the allocated bandwidth of the k-th period is denoted by bk,i, the bandwidth allocation amount per period is represented by the mathematical relationship (4).

[Math. 4]

$$b_{1,i} = b_{2,i} = \ldots = b_{k,i} \ldots = b_{M,i} = \frac{b_i}{M} \tag{4}$$

The bandwidth-allocation amount definition unit 209 outputs the defined allocated bandwidth bi/M to the lower transmission and reception unit 202. The lower transmission and reception unit 202 converts the received allocated bandwidth into a format of a control signal for the subscriber line termination apparatus 300. The lower transmission and reception unit 202 transmits the converted control signal as a bandwidth allocation signal to the subscriber line termination apparatus 300.

In a case where it is determined that the latency requirement is not satisfied, the bandwidth-allocation amount definition unit 209 defines the bandwidth allocation amount by the second bandwidth allocation processing. The second bandwidth allocation processing is performed as follows. Firstly, the bandwidth-allocation amount definition unit 209 defines the maximum number Nmax of the subscriber line termination apparatuses 300 capable of transmission within the latency requirement Rreq. The bandwidth-allocation amount definition unit 209 defines Nmax by solving a linear programming problem represented by the mathematical relationship (5), the mathematical relationship (6), and the mathematical relationship (7).

[Math. 5]

$$\forall n_i \in \{0, 1\} \quad (5)$$

[Math. 6]

$$\max: N_{max} = \sum_{i=1}^{N_{onu}} n_i \quad (6)$$

[Math. 7]

$$\text{sub. to:} \sum_{i=1}^{N_{onu}} n_i r_i < R_{req} \quad (7)$$

The bandwidth-allocation amount definition unit 209 specifies the subscriber line termination apparatus 300 that can be accommodated and the subscriber line termination apparatus 300 that cannot be accommodated in accordance with the mathematical relationship (5) to the mathematical relationship (7). Here, in the mathematical relationship (8) to the mathematical relationship (13), an identifier of the subscriber line termination apparatus 300 that can be accommodated is defined as i, and an identifier of the subscriber line termination apparatus 300 that cannot be accommodated is defined as j. In this case, the bandwidth allocation amount bi to the subscriber line termination apparatus 300 that can be accommodated is represented by the mathematical relationship (8). In contrast, the bandwidth allocation amount bj to the subscriber line termination apparatus 300 that cannot be accommodated is represented by the mathematical relationship (9).

[Math. 8]

$$b_i = \frac{r_i}{\sum_{k=1, k \neq j}^{N_{onu}} r_k} b_{all} \quad (8)$$

[Math. 9]

$$b_j = \frac{r_j}{\sum_{k=1, k \neq i}^{N_{onu}} r_k} b_{all} \quad (9)$$

The bandwidth-allocation amount definition unit 209 performs bandwidth allocation from the head position of burst traffic, on the basis of the received bandwidth allocation start time. Specifically, the bandwidth-allocation amount definition unit 209 divides the bandwidth allocation amount bi into M' pieces and then M-M' pieces. The M' is a predetermined number that is designated in advance.

The bandwidth allocation amounts bk,i and bk,j divided into M' pieces for the subscriber line termination apparatus 300 are represented by the mathematical relationship (10) and the mathematical relationship (11). The value of the variable k indicates the number of divisions. As the value of the variable k becomes smaller, the variable k approaches the head position of the burst traffic. The mathematical relationship (10) represents a bandwidth allocated to the subscriber line termination apparatus 300 that can be accommodated. The mathematical relationship (11) represents a bandwidth allocated to the impossible subscriber line termination apparatus 300. The bandwidth has not yet been allocated to the subscriber line termination apparatus 300 that can be accommodated. Thus, the value for each term in the mathematical relationship (11) is 0.

[Math 10]

$$b_{1,i} = b_{2,i} = \ldots = b_{k,i} \ldots = b_{M',i} = \frac{b_i}{M'} \quad (10)$$

[Math. 11]

$$b_{1,j} = b_{2,j} = \ldots = b_{k,j} \ldots = b_{M',j} = 0 \quad (11)$$

The bandwidth allocation amounts bk,i and bk,j corresponding to the transmission period of the remaining M-M' pieces are represented by the mathematical relationship (12) and the mathematical relationship (13). The mathematical relationship (12) represents the bandwidth that is allocated to the accommodated subscriber line termination apparatus 300. The bandwidth has already been allocated to the accommodated subscriber line termination apparatus 300. Thus, the value for each term in the mathematical relationship (12) is 0. The mathematical relationship (13) represents the bandwidth allocated from an unused bandwidth to the subscriber line termination apparatus 300 that cannot be accommodated. The unused bandwidth is a bandwidth obtained by removing, from the entire bandwidth, the bandwidth allocation amount allocated to the subscriber line termination apparatus 300 that can be accommodated.

[Math. 12]

$$b_{M'+1,i} = b_{M'+2,i} = \ldots = b_{M'+k,i} \ldots = b_{M,i} = 0 \quad (12)$$

[Math. 13]

$$b_{M'+1,j} = b_{M'+2,j} = \ldots = b_{M'+k,j} \ldots = b_{M,j} = \frac{b_j}{M - M'} \quad (13)$$

The bandwidth-allocation amount definition unit 209 outputs the allocated bandwidth defined by the mathematical relationship (10) to the mathematical relationship (13), to the tower transmission and reception unit 202. The lower transmission and reception unit 202 converts the received allocated bandwidth into a format of a control signal for the subscriber line termination apparatus 300. The lower transmission and reception unit 202 transmits the converted control signal as a bandwidth allocation signal to the subscriber line termination apparatus 300. The bandwidth-allocation amount definition unit 209 may be configured to sequentially allocate bandwidths in order from the subscriber line termination apparatus 300 having higher required throughput.

The subscriber line termination apparatus 300 is an ONU. The subscriber line termination apparatus 300 is an apparatus that realizes a communication with another communication apparatus by an optical signal transmitted through an optical communication network. The optical communication network to which the subscriber line termination apparatus 300 is connected is an optical fiber network such as a PON, for example. The subscriber line termination apparatus 300 may be configured with a plurality of devices. The subscriber line termination apparatus 300 may be installed, for example, in a mobile fronthaul.

In the subscriber line termination apparatus 300, a portion or the entirety of each functional unit is realized, for example, by a processor such as CPU executing a program stored in a storage unit. The storage unit includes, for example, a non-volatile recording medium (non-transitory recording medium) such as a magnetic hard disk device or a semiconductor storage device. The subscriber line termination apparatus 300 includes a CPU, a memory, an auxiliary storage device, and the like connected by a bus. The subscriber line termination apparatus 300 executes a bandwidth request program to function as an apparatus including an uplink signal transmission unit 301.

The uplink signal transmission unit 301 receives the bandwidth allocation signal from the subscriber line end station apparatus 200. The uplink signal transmission unit 301 transmits the designated amount of data as an uplink signal to the higher apparatus 100, at the time designated by the bandwidth allocation signal. Thus it is possible to prevent frame collision with signals transmitted from other subscriber line termination apparatuses 300.

The lower apparatus 400 is an antenna unit (DU) of a radio base station. The lower apparatus 400 includes a CPU, a memory, an auxiliary storage device, and the like connected by a bus. The lower apparatus 400 transmits a signal in an uplink (referred to as "an uplink signal" below) to the subscriber line termination apparatus 300. The lower apparatus 400 further includes an antenna unit that receives an uplink signal from the mobile terminal (UE). The lower apparatus 400 performs demodulation and decoding of the uplink signal received from the mobile terminal. The lower apparatus 400 converts the uplink signal into a format of a signal that can be recognized by the subscriber line termination apparatus 300. The lower apparatus 400 transmits the converted uplink signal to the subscriber line termination apparatus 300.

Figure 3:
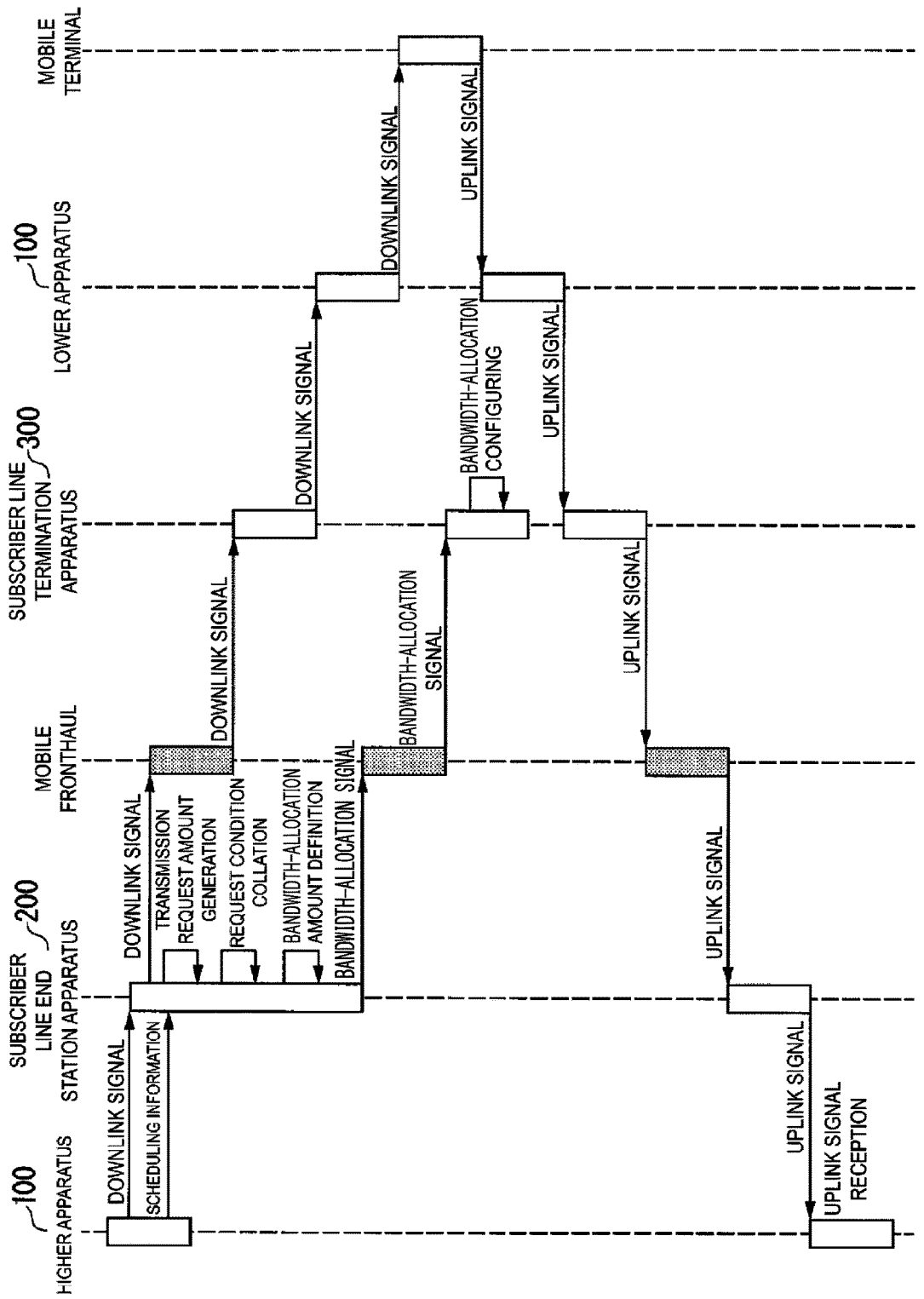
FIG. 3 is a diagram illustrating an example of a time chart for bandwidth allocation in the optical communication system.

FIG. 3 is a diagram illustrating an example of a time chart for bandwidth allocation in the optical communication system 1. According to FIG. 3, the higher apparatus 100 transmits a downlink signal and the scheduling information to the subscriber line end station apparatus 200. The subscriber line end station apparatus 200 transmits the downlink signal to the subscriber line termination apparatus 300 through the mobile fronthaul. The subscriber line end station apparatus 200 generates transmission request amount information on the basis of the scheduling information. The subscriber line end station apparatus 200 determines whether the transmission request amount information satisfies a predetermined condition. The subscriber line end station apparatus 200 defines the bandwidth allocation amount on the basis of the determination result. The subscriber line end station apparatus 200 transmits a bandwidth allocation signal to the subscriber line termination apparatus 300 through the mobile fronthaul.

The subscriber line termination apparatus 300 transmits the downlink signal to the lower apparatus 400. The subscriber line termination apparatus 300 configures a bandwidth based on the bandwidth allocation signal. The lower apparatus 400 transmits the downlink signal to the mobile terminal. The mobile terminal transmits an uplink signal to the lower apparatus 400. The lower apparatus 400 transmits the uplink signal to the subscriber line termination apparatus 300. The subscriber line termination apparatus 300 transmits, on the basis of the configured bandwidth, the uplink signal to the subscriber line end station apparatus 200 through the mobile fronthaul. The subscriber line end station apparatus 200 transmits the uplink signal to the higher apparatus 100. The higher apparatus 100 receives the uplink signal.

Figure 4:
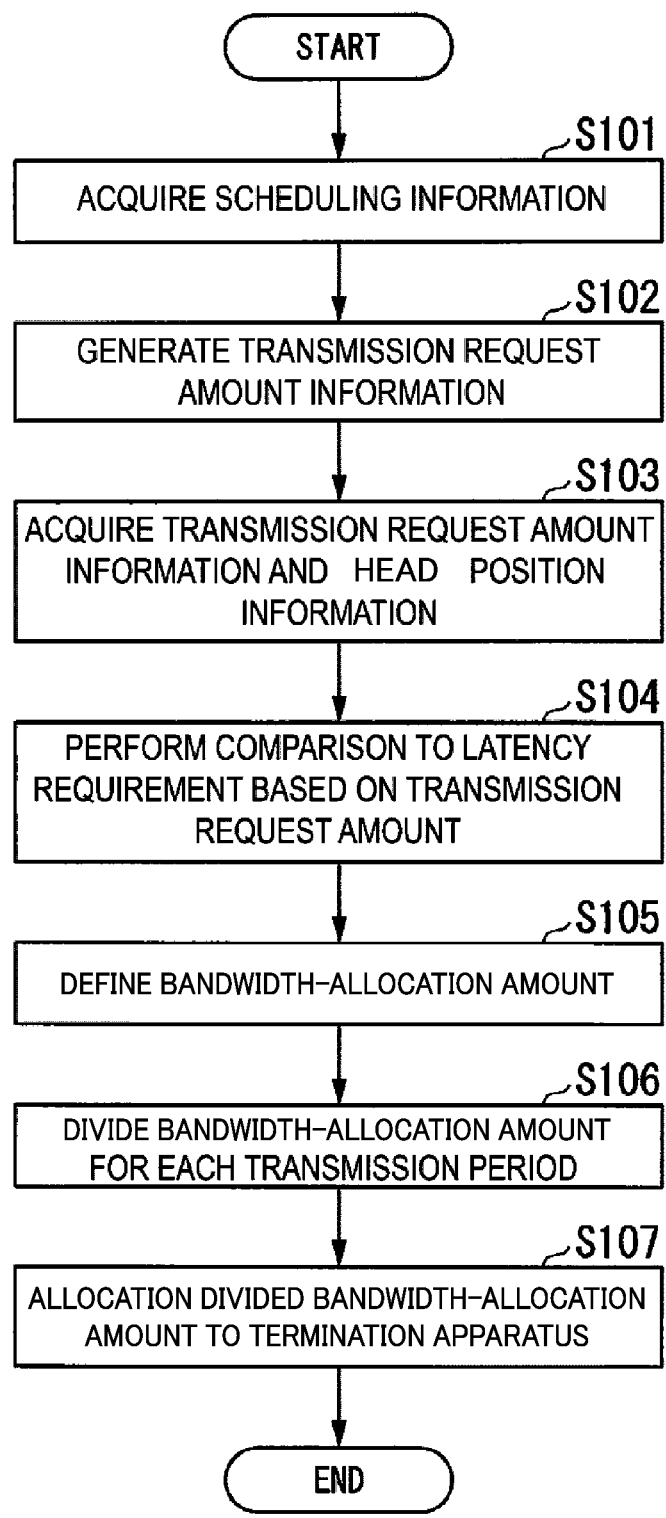
FIG. 4 is a flowchart illustrating a processing flow of bandwidth allocation in the optical communication system.

FIG. 4 is a flowchart illustrating a processing flow of bandwidth allocation in the optical communication system 1. The scheduling information acquisition unit 203 acquires scheduling information (Step S101). The transmission request amount information generation unit 205 generates transmission request amount information by converting the received scheduling information into a format used in the transmission of the uplink signal in a TDM-PON (Step S102). The transmission request amount information acquisition unit 207 acquires the generated transmission request amount information and head position information for each subscriber line termination apparatus 300 (Step S103).

The request condition collation unit 208 defines the transmission request amount on the basis of the transmission data amount included in the transmission request amount information. The request condition collation unit 208 compares the latency requirement and the defined transmission request amount to each other (Step S104). The bandwidth-allocation amount definition unit 209 defines the bandwidth allocation amount for each subscriber line termination apparatus 300 in accordance with the comparison result (Step S105). The bandwidth-allocation amount definition unit 209 divides the defined bandwidth allocation amount for each transmission period (Step S106). The bandwidth-allocation amount definition unit 209 allocates the divided bandwidth allocation amount to the subscriber line termination apparatus 300 (Step S107).

Figure 5:
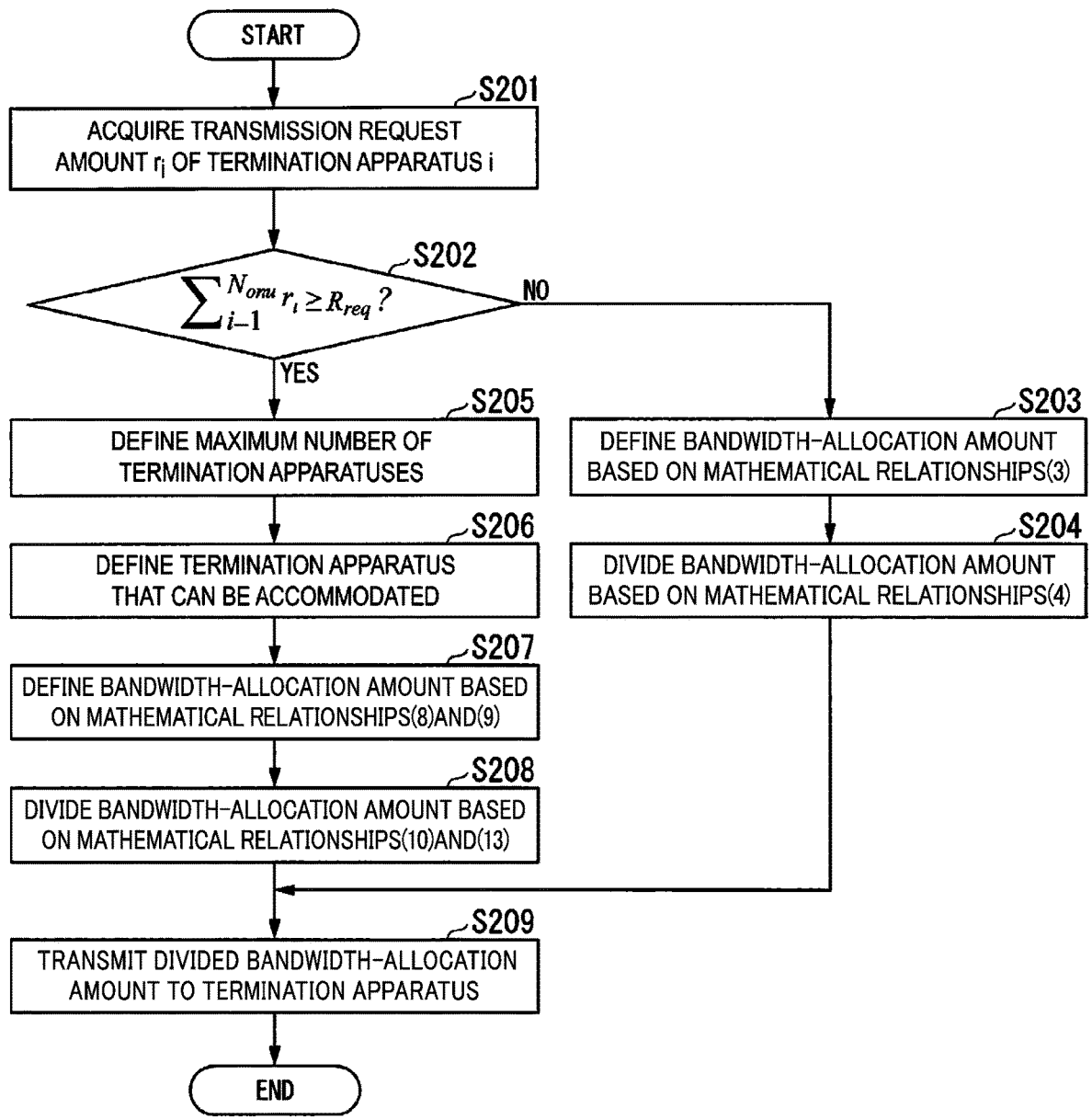
FIG. 5 is a flowchart illustrating a processing flow of bandwidth allocation amount computation in the first embodiment.

FIG. 5 is a flowchart illustrating a processing flow of bandwidth allocation amount computation in the first embodiment. The request condition collation unit 208 acquires the transmission request amount ri of the termination apparatus i from the transmission request amount information acquisition unit 207. (Step S201). The request condition collation unit 208 compares the latency requirement and the acquired transmission request amount to each other (Step S202). Specifically, the request condition collation unit 208 determines whether the mathematical relationship (2) is established. In a case where the mathematical relationship (2) is not established (Step S202: NO), the processing transitions to Step S203. In a case where the mathematical relationship (2) is established (Step S202: YES), the processing transitions to Step S205.

The bandwidth-allocation amount definition unit 209 defines the bandwidth allocation amount bi on the bsis of the mathematical relationship (3) (Step S203). The bandwidth-allocation amount definition unit 209 defines the bandwidth allocation amount for each subscriber line termination apparatus 300. The bandwidth-allocation amount definition unit 209 divides the defined bandwidth allocation amount bi into M pieces, on the basis of the mathematical relationship (4) (Step S204). After Step S204 is performed, the processing transitions to Step S209.

The bandwidth-allocation amount definition unit 209 defines the maximum number Nmax of the subscriber line termination apparatuses 300 capable of transmission within the latency requirement Rreq (Step S205). The bandwidth-allocation amount definition unit 209 specifies the subscriber line termination apparatus 300 that can be accommodated in accordance with the mathematical relationship (5) to the mathematical relationship (7) (Step S206). Specifically, the bandwidth-allocation amount definition unit 209 defines Nmax by solving a linear programming problem represented by the mathematical relationship (5), the mathematical relationship (6), and the mathematical relationship (7). The bandwidth-allocation amount definition unit 209 specifies the subscriber line termination apparatus 300 that can be accommodated and the subscriber line termination apparatus 300 that cannot be accommodated by solving the linear programming problem represented by the mathematical relationship (5), the mathematical relationship (6), and the mathematical relationship (7). The bandwidth-allocation amount definition unit 209 defines the bandwidth allocation amount to the subscriber line termination apparatus 300 that can be accommodated, based on the mathematical relationship (8) (Step S207). The bandwidth-allocation amount definition unit 209 defines the bandwidth allocation amount to the subscriber line termination apparatus 300 that cannot be accommodated, on the basis of the mathematical relationship (9). The bandwidth-allocation amount definition unit 209 divides the defined bandwidth allocation amount on the basis of the mathematical relationship (10) to the mathematical relationship (13) (Step S208). The bandwidth-allocation amount definition unit 209 allocates the divided allocated bandwidth to the subscriber line termination apparatus 300 (Step S209).

In the optical communication system 1 configured in this manner, the request condition collation unit 208 defines the transmission request amount indicating the allocated amount of the bandwidth requested by the subscriber line termination apparatus 300. The request condition collation unit 208 determines whether the transmission request amount satisfies the latency requirement. Specifically, the request condition collation unit 208 determines whether data amount corresponding to the transmission request amount can be transmitted within the time defined by the latency requirement. If the latency requirement is not satisfied, the bandwidth-allocation amount definition unit 209 defines the subscriber line termination apparatus 300 that can be accommodated. The bandwidth-allocation amount definition unit 209 defines the bandwidth allocation amount for the defined subscriber line termination apparatus 300. Thus, it is possible that the subscriber line termination apparatus 300 that can be accommodated transmits within the time of the latency requirement, and minimizes the number of subscriber line termination apparatuses 300 that do not satisfy the latency requirement.

Second Embodiment

Next, an optical communication system 1 according to a second embodiment will be described. The optical communication system 1 in the second embodiment is different from the first embodiment in that a bandwidth-allocation amount definition unit 209a in the subscriber line end station apparatus 200 completely stops bandwidth allocation to the subscriber line termination apparatus 300 in which transmission within the latency requirement is not possible, the other components in the second embodiment are identical to those in the first embodiment. Differences from the first embodiment will be described below.

Figure 6:
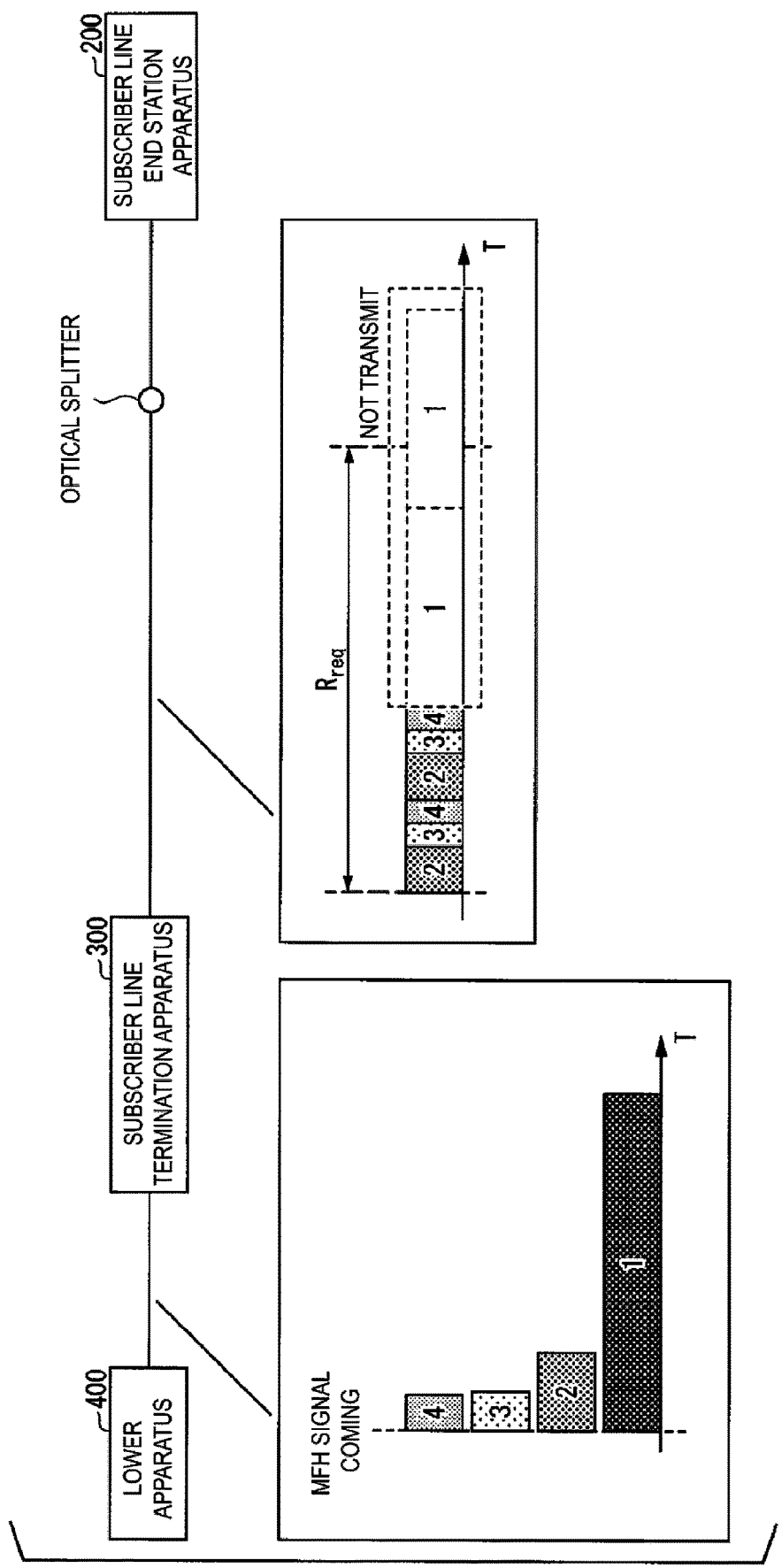
FIG. 6 is a diagram illustrating an example of an operation concept of an optical communication system 1 according to a second embodiment.

FIG. 6 is a diagram illustrating an example of an operation concept of the optical communication system 1 in the second embodiment. According to FIG. 6, the lower apparatus 400 transmits an uplink signal to the subscriber line termination apparatus 300.

The subscriber line termination apparatus 300 transmits the received uplink signal to the subscriber line end station apparatus 200. In a case where the total amount of the uplink signal exceeds the latency requirement Rreq, the subscriber line termination apparatus 300 does not transmit the uplink signal of the subscriber line termination apparatus 300, which exceeds the latency requirement, to the subscriber line end station apparatus 200.

Figure 7:
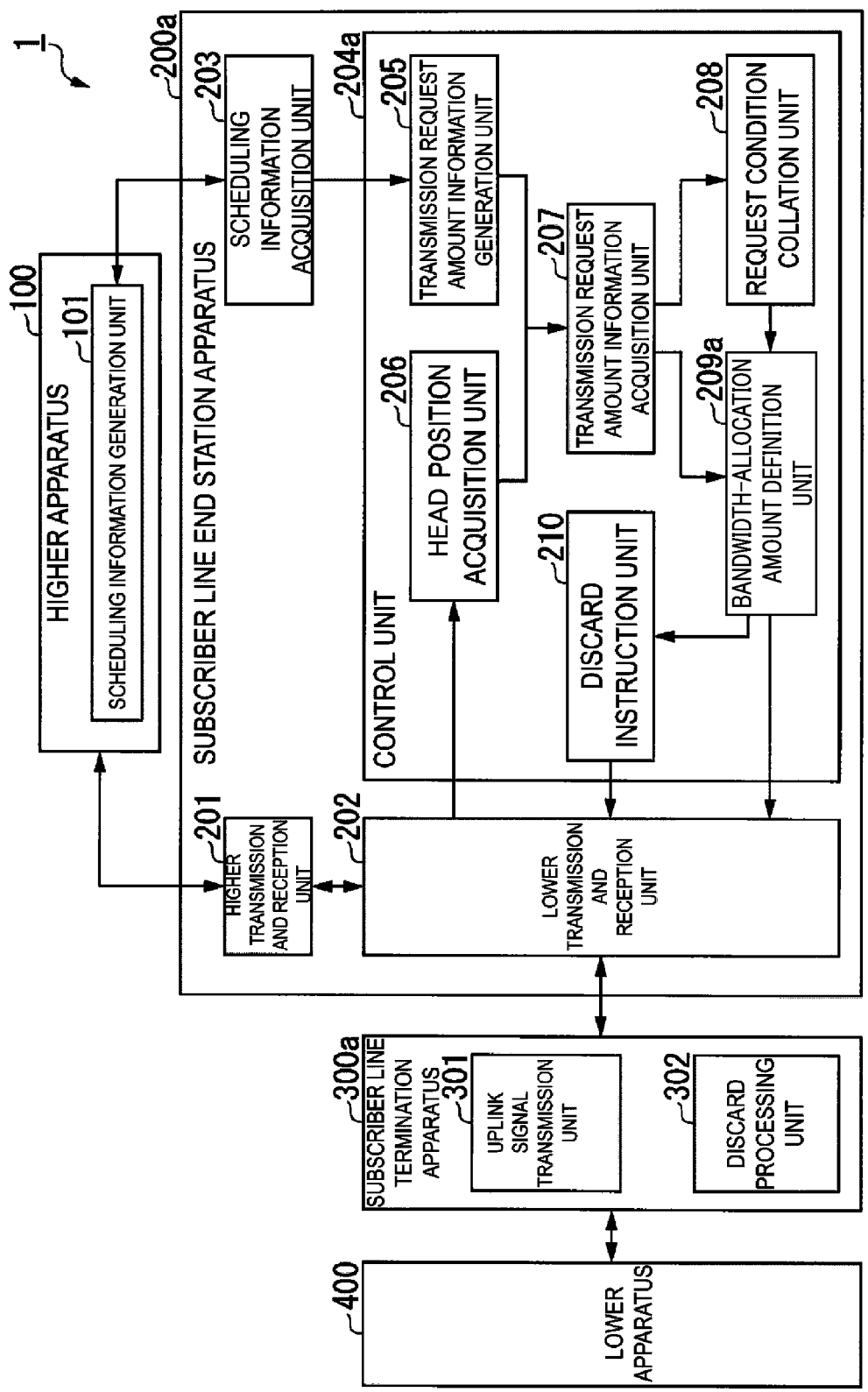
FIG. 7 is a system configuration diagram illustrating a system configuration of the optical communication system 1 in the second embodiment.

FIG. 7 is a system configuration diagram illustrating a system configuration of the optical communication system 1 in the second embodiment. The optical communication system 1 includes a subscriber line end station apparatus 200a instead of the subscriber line end station apparatus 200, and includes a subscriber line termination apparatus 300a instead of the subscriber line termination apparatus 300. The subscriber line end station apparatus 200a includes a control unit 204a instead of the control unit 204. The subscriber line termination apparatus 300a further includes a discard processing unit 302. The optical communication system 1 is identical to the optical communication system 1 of the first embodiment except for the above points.

The control unit 204a controls an operation of each unit in the subscriber line end station apparatus 200a. The control unit 204a is executed, for example, by an apparatus including a processor such as a CPU, and a RAM. The control unit 204a executes the bandwidth allocation program to function as the transmission request amount information generation unit 205, the head position acquisition unit 206, the transmission request amount information acquisition unit 207, the request condition collation unit 208, the bandwidth-allocation amount definition unit 209a, and a discard instruction unit 210.

The bandwidth-allocation amount definition unit 209a defines bandwidth allocation start time for each subscriber line termination apparatus 300, on the basis of the acquired head position information and the transmission request amount information. The bandwidth-allocation amount definition unit 209a defines the bandwidth allocation amount for the subscriber line termination apparatus 300. The bandwidth-allocation amount definition unit 209a defines the bandwidth allocation amount in response to the determination result received from the request condition collation unit 208. In a case where the request condition collation unit 208 determines that the latency requirement is satisfied, the bandwidth-allocation amount definition unit 209a defines the bandwidth allocation amount by the first bandwidth allocation processing. The first bandwidth allocation processing is identical to the processing in the first embodiment.

In a case where the request condition collation unit 208 determines that the latency requirement is not satisfied, the bandwidth-allocation amount definition unit 209a defines the bandwidth allocation amount by the second bandwidth allocation processing. The second bandwidth allocation processing is performed as follows. Firstly, the bandwidth-allocation amount definition unit 209a defines the maximum number Nmax of the subscriber line termination apparatuses 300 capable of transmission within the latency requirement Rreq. Similar to the first embodiment, the bandwidth-allocation amount definition unit 209a defines Nmax by solving a linear programming problem represented by the mathematical relationship (5), the mathematical relationship (6), and the mathematical relationship (7).

The bandwidth-allocation amount definition unit 209a defines the subscriber line termination apparatus 300 that can be accommodated and the subscriber line termination apparatus 300 that cannot be accommodated in accordance with the mathematical relationship (5) to the mathematical relationship (7). Here, in the mathematical relationship (8) to the mathematical relationship (14), an identifier of the subscriber line termination apparatus 300 that can be accommodated is defined as i, and an identifier of the subscriber line termination apparatus 300 that cannot be accommodated is defined as j. In this case, the bandwidth allocation amount bi to the subscriber line termination apparatus 300 that can be accommodated is represented by the mathematical relationship (8), similar to the first embodiment. On the other hand, the bandwidth allocation amount bj to the subscriber line termination apparatus 300 that cannot be accommodated is represented by the mathematical relationship (14).

[Math. 14]

$$b_j = 0 \quad (14)$$

The bandwidth-allocation amount definition unit 209a performs bandwidth allocation from the head position of burst traffic, on the basis of the received bandwidth allocation start time. Specifically, the bandwidth-allocation amount definition unit 209a divides the bandwidth allocation amount bi into M' pieces and then M-M' pieces. M' is a predetermined number that is designated in advance. The bandwidth allocation amounts bk,i and bk,j divided into M' pieces for the subscriber line termination apparatus 300 are represented by the mathematical relationship (10) and the mathematical relationship (11). The value of the variable k indicating the number of divisions becomes closer to the beginning of the burst traffic as the value becomes smaller. The bandwidth allocation amounts bk,i and bk,j corresponding to the transmission period of the remaining M-M' pieces are represented by the mathematical relationship (12) and the mathematical relationship (13).

The bandwidth-allocation amount definition unit 209a outputs the allocated bandwidth defined by the mathematical relationship (10) to the mathematical relationship (13), to the lower transmission and reception unit 202. The lower transmission and reception unit 202 converts the received allocated bandwidth into a format of a control signal for the subscriber line termination apparatus 300a. The lower transmission and reception unit 202 transmits the converted control signal as a bandwidth allocation signal to the subscriber line termination apparatus 300a. The bandwidth-allocation amount definition unit 209a outputs identification information for identifying the subscriber line termination apparatus 300a to which the bandwidth has not been allocated, to the discard instruction unit 210. The bandwidth-allocation amount definition unit 209a may be configured to sequentially allocate bandwidths in order from the subscriber line termination apparatus 300a having higher required throughput.

The discard instruction unit 210 transmits frame discard instruction information to the subscriber line termination apparatus 300a to which the bandwidth has not been allocated. The discard instruction unit 210 receives, from the bandwidth-allocation amount definition unit 209a, identification information for identifying the subscriber line termination apparatus 300a to which the bandwidth has not been allocated. The discard instruction unit 210 generates discard instruction information of instructing the subscriber line termination apparatus 300a identified by the identification information to discard a frame. The discard instruction unit 210 transmits the generated discard instruction information to the subscriber line termination apparatus 300a.

The discard processing unit 302 receives the transmitted discard instruction information. If the discard processing unit 302 receives the discard instruction information, it discards the frame included in the uplink signal received from the lower apparatus 400.

Figure 8:
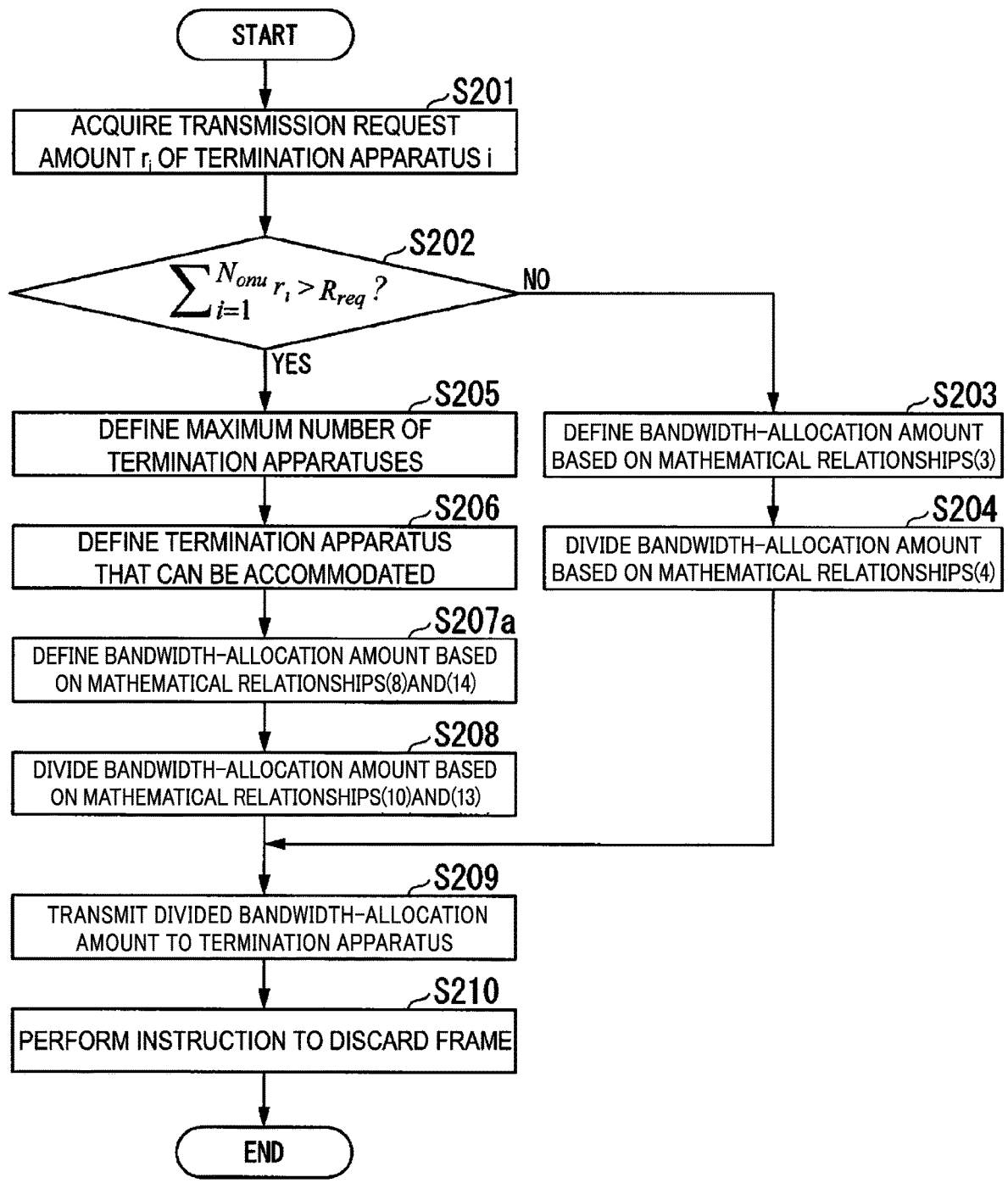
FIG. 8 is a flowchart illustrating a processing flow of bandwidth allocation amount computation in the second embodiment.
Figure 9:
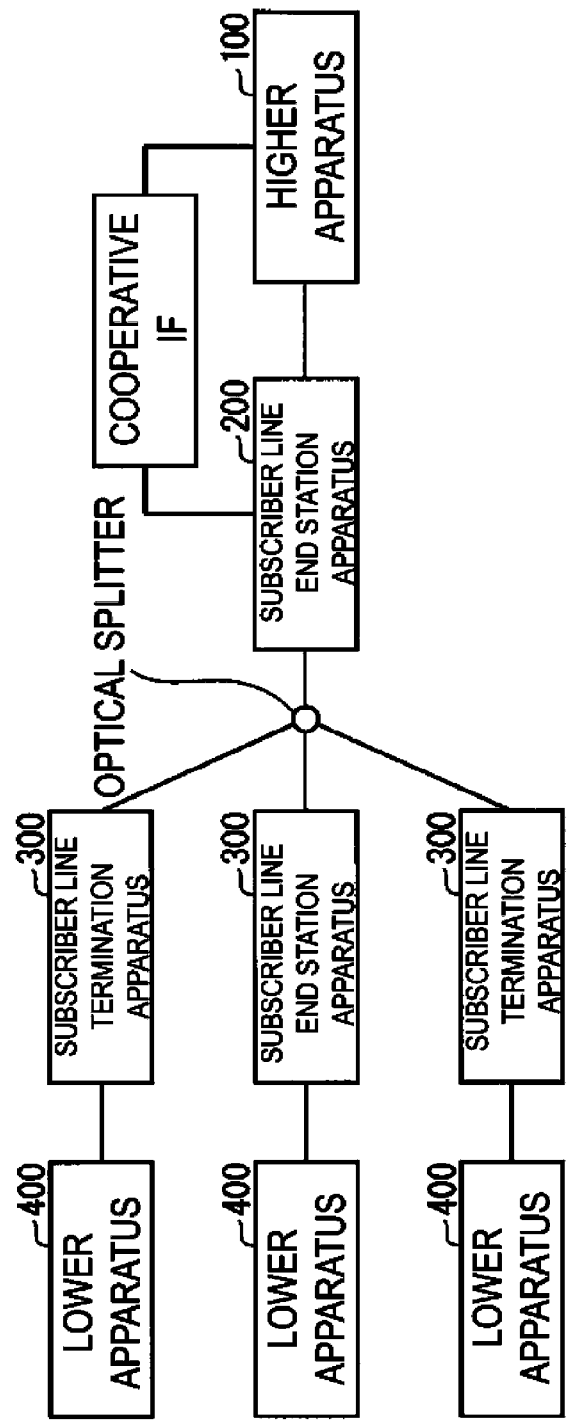
FIG. 9 is a diagram illustrating an example of a configuration of a TDM-PON system.
Figure 10:
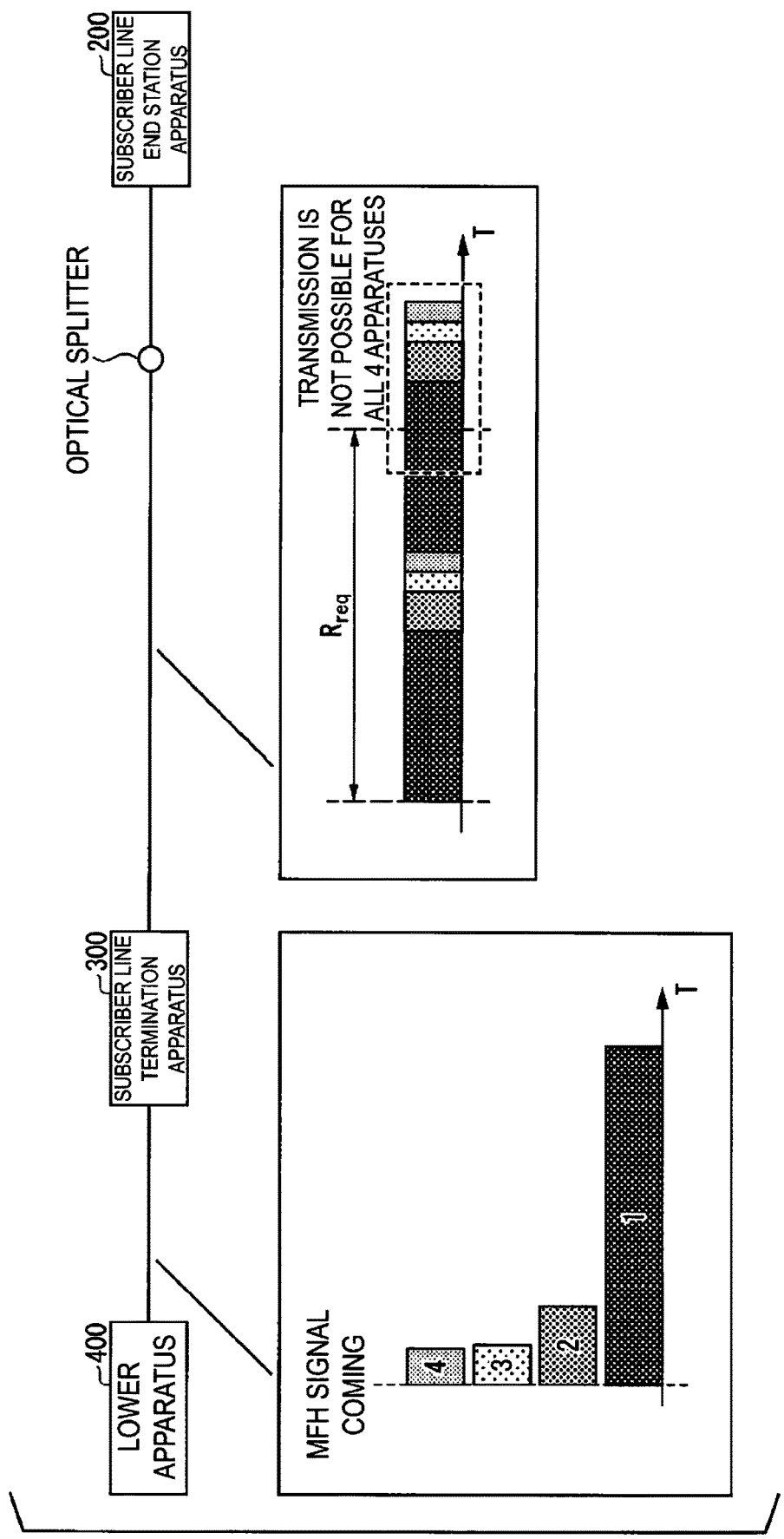
FIG. 10 is a diagram illustrating an example of a case where data is discarded in the TDM-PON system.

FIG. 8 is a flowchart illustrating a processing flow of bandwidth allocation amount computation in the second embodiment. In the flowchart, the processing from Step S201 to Step S206 are identical to those in the first embodiment, and thus description of the processing will not be repeated.

The bandwidth-allocation amount definition unit 209 defines the bandwidth allocation amount to the subscriber line termination apparatus 300 that can be accommodated, on the basis of the mathematical relationship (8) (Step S207a). The bandwidth-allocation amount definition unit 209 defines the bandwidth allocation amount to the subscriber line termination apparatus 300 that cannot be accommodated, on the basis of the mathematical relationship (14). The bandwidth-allocation amount definition unit 209 divides the defined bandwidth allocation amount on the basis of the mathematical relationship (10) to the mathematical relationship (13) (Step S208). The bandwidth-allocation amount definition unit 209 transmits the divided allocated bandwidth to the subscriber line termination apparatus 300a (Step S209). The discard instruction unit 210 transmits discard instruction information of an instruction to discard a frame, to the subscriber line termination apparatus 300a (Step S210).

In the optical communication system 1 configured in this manner, the request condition collation unit 208 defines the transmission request amount information indicating the allocated amount of the bandwidth requested by the subscriber line termination apparatus 300. The request condition collation unit 208 determines whether the transmission request amount satisfies the latency requirement. Specifically, the request condition collation unit 208 determines whether data amount corresponding to the transmission request amount can be transmitted within the latency requirement. If the latency requirement is not satisfied, the bandwidth-allocation amount definition unit 209a defines the subscriber line termination apparatus 300a that can be accommodated. The bandwidth-allocation amount definition unit 209a defines the bandwidth allocation amount for the defined subscriber line termination apparatus 300a. The discard instruction unit 210 transmits the discard instruction information for discarding a frame, to the subscriber line termination apparatus 300a. The subscriber line termination apparatus 300a discards the frame on the basis of the discard instruction information. Thus, it is possible that the subscriber line termination apparatus 300a that can be accommodated transmits within the latency requirement, and minimizes the number of subscriber line termination apparatuses 300a that do not satisfy the latency requirement.

Third Embodiment

Next, an optical communication system 1 according to the third embodiment will be described. In the optical communication system 1 according to the first and second embodiments, the number of subscriber line termination apparatuses 300 that can be accommodated has been maximized. The optical communication system 1 in the third embodiment is different from the first and second embodiments in that a bandwidth is allocated in consideration of the priority of the subscriber line termination apparatus 300. The other components in the third embodiment are identical to those in the first and second embodiments. Differences from the first and second embodiments will be described below.

In the third embodiment, the lower apparatus that has to absolutely perform transmission within the latency requirement is set for the bandwidth-allocation amount definition unit 209 in advance. The bandwidth-allocation amount definition unit 209 defines Nmax such that the subscriber line termination apparatus 300 connected with the lower apparatus 400 set above is included as the subscriber line termination apparatus 300 that can be accommodated. Similar to the first or second embodiment, the bandwidth-allocation amount definition unit 209 defines Nmax by solving a linear programming problem represented by the mathematical relationship (5), the mathematical relationship (6), and the mathematical relationship (7). The priority may be defined for each lower apparatus 400 or may be defined for each mobile terminal.

In the optical communication system 1 configured in this manner, the bandwidth-allocation amount definition unit 209 defines Nmax such that the subscriber line termination apparatus 300 connected to the lower apparatus 400 set in advance is included as the subscriber line termination apparatus 300 that can be accommodated. Thus, even in a case of the lower apparatus 400 in which latency is not allowed, it is possible to perform transmission within the latency requirement.

In the above-described embodiments, the subscriber line end station apparatus 200 and the subscriber line termination apparatus 300 may be implemented by a computer. In this case, a program for realizing this function may be recorded on a computer readable recording medium, and the program recorded on the recording medium may be read into a computer system and is executed. It is assumed that "the computer system" here includes an OS or hardware such as peripheral devices. "The computer readable recording medium" refers to a portable medium such as a flexible disk, a magneto-optical disk, a ROM, and a CD-ROM, or a storage device such as a hard disk mounted in a computer system. Further, "the computer readable recording medium" may a medium that dynamically holds a program for a short period, for example, a communication line in a case where the program is transmitted via a network such as the Internet or a communication circuit line such as a telephone line; and a medium that holds a program for a predetermined period, for example, a volatile memory in a computer system as a server or a client in that case. The program may also be configured to realize some of the above-described functions, or may allow realization of the above-described functions by a combination with a program which has already been recorded in a computer system. The program may also be achieved by using a programmable logic device such as a Field Programmable Gate Array (FPGA).

Hitherto, the embodiments of this disclosure have been described above in detail with reference to the drawings, hut the specific configuration is not limited to the embodiments, and designs in a range without departing from the gist of this disclosure are also included.

INDUSTRIAL APPLICABILITY

This disclosure may be applied to an optical access service that provides a user with an optical communication environment.

REFERENCE SIGNS LIST

Optical communication system
100 Higher apparatus
101 Scheduling information generation unit
200 Subscriber line end station apparatus
201 Higher transmission and reception unit
202 Lower transmission and reception unit
203 Scheduling information acquisition unit
204 Control unit
205 Transmission request amount information generation unit
206 Head position acquisition unit
207 Transmission request amount information acquisition unit
208 Request condition collation unit
209 Bandwidth-allocation amount definition unit
300 Subscriber line termination apparatus
301 Uplink signal transmission unit
400 Lower apparatus
200a Subscriber line end station apparatus
204a Control unit
209a Bandwidth-allocation amount definition unit
210 Discard instruction unit
300a Subscriber line termination apparatus
302 Discard processing unit

The invention claimed is:

1. A bandwidth allocation apparatus comprising:
a processor; and
a storage medium having computer program instructions stored thereon, wherein the computer program instructions, when executed by the processor, perform processing of:
acquiring request information indicating a required amount for a bandwidth allocation by using a communication link separated from a data link used in data communication;
determining based on the request information, whether the bandwidth allocation that allows transmission of data within a designated time, to a termination apparatus is possible; and
in a case where the bandwidth allocation to the termination apparatus is determined not to be possible, specifying some termination apparatuses to which the bandwidth allocation that allows transmission of data within the designated time, is possible, defining a bandwidth allocation amount for a specified termination apparatus, and allocating the defined bandwidth allocation amount to the specified termination apparatus.

2. The bandwidth allocation apparatus according to claim 1, wherein the computer program instructions, when executed by the processor, further perform processing of:
acquiring head position information indicating head data of burst traffic in an uplink signal transmitted from the termination apparatus to an end station apparatus;
based on the request information and the head position information, defining bandwidth allocation time indicating time at which the bandwidth allocation amount is allocated; and
allocating the bandwidth allocation amount to the termination apparatus at the bandwidth allocation time.

3. The bandwidth allocation apparatus according to claim 1, wherein the computer program instructions, when executed by the processor, further perform processing of:
in a case where the bandwidth allocation to the termination apparatus is determined not to be possible, defining the bandwidth allocation amount to maximize a number of a plurality of the termination apparatuses capable of transmitting data within the designated time.

4. The bandwidth allocation apparatus according to claim 1, wherein the computer program instructions, when executed by the processor, further perform processing of:
in a case where the bandwidth allocation to the termination apparatus is determined not to be possible, defining the bandwidth allocation amount to maximize a number of a plurality of the termination apparatuses which include a pre-designated termination apparatus and are capable of transmitting data within the designated time.

5. The bandwidth allocation apparatus according to claim 3, wherein the computer program instructions, when executed by the processor, further perform processing of:

defining, in an unused bandwidth, the bandwidth allocation amount to the termination apparatus not capable of transmitting data within the designated time, the unused bandwidth being obtained by removing, from an entire bandwidth, the bandwidth allocation amount to the termination apparatus capable of transmitting data within the designated time.

6. The bandwidth allocation apparatus according to claim 3, wherein the computer program instructions, when executed by the processor, further perform processing of:

transmitting a discard instruction to cause data to be discarded, to the termination apparatus not capable of transmitting data within the designated time.

7. A bandwidth allocation method of a bandwidth allocation apparatus, the method comprising:

acquiring request information indicating a required amount for a bandwidth allocation by using a communication link separated from a data link used in data communication;

determining, based on the request information, whether the bandwidth allocation that allows transmission of data within designated time, to a termination apparatus is possible; and in a case where the bandwidth allocation to the termination apparatus is determined not to be possible, specifying some termination apparatuses to which the bandwidth allocation that allows transmission of data within the designated time, is possible, defining a bandwidth allocation amount for a specified termination apparatus, and allocating the defined bandwidth allocation amount to the specified termination apparatus.

8. The bandwidth allocation apparatus according to claim 4, wherein the computer program instructions further perform processing of:

defining, in an unused bandwidth, the bandwidth allocation amount to the termination apparatus not capable of transmitting data within the designated time, the unused bandwidth being obtained by removing, from an entire bandwidth, the bandwidth allocation amount to the termination apparatus capable of transmitting data within the designated time.

9. The bandwidth allocation apparatus according to claim 4, wherein the computer program instructions further perform processing of:

transmitting a discard instruction to cause data to be discarded, to the termination apparatus not capable of transmitting data within the designated time.

10. The bandwidth allocation method according to claim 7, further comprising:

acquiring head position information indicating head data of burst traffic in an uplink signal transmitted from the termination apparatus to an end station apparatus;

based on the request information and the head position information, defining bandwidth allocation time indicating time at which the bandwidth allocation amount is allocated; and allocating the bandwidth allocation amount to the termination apparatus at the bandwidth allocation time.

11. The bandwidth allocation method according to claim 7, further comprising:

in a case where the bandwidth allocation to the termination apparatus is determined not to be possible, defining the bandwidth allocation amount to maximize a number of a plurality of the termination apparatuses capable of transmitting data within the designated time.

12. The bandwidth allocation method according to claim 11, further comprising:

defining, in an unused bandwidth, the bandwidth allocation amount to the termination apparatus not capable of transmitting data within the designated time, the unused bandwidth being obtained by removing, from an entire bandwidth, the bandwidth allocation amount to the termination apparatus capable of transmitting data within the designated time.

13. The bandwidth allocation method according to claim 11, further comprising:

transmitting a discard instruction to cause data to be discarded, to the termination apparatus not capable of transmitting data within the designated time.

14. The bandwidth allocation method according to claim 7, further comprising:

in a case where the bandwidth allocation to the termination apparatus is determined not to be possible, defining the bandwidth allocation amount to maximize a number of a plurality of the termination apparatuses which include a pre-designated termination apparatus and are capable of transmitting data within the designated time.

15. The bandwidth allocation method according to claim 14, further comprising:

defining, in an unused bandwidth, the bandwidth allocation amount to the termination apparatus not capable of transmitting data within the designated time, the unused bandwidth being obtained by removing, from an entire bandwidth, the bandwidth allocation amount to the termination apparatus capable of transmitting data within the designated time.

16. The bandwidth allocation method according to claim 14, further comprising:

transmitting a discard instruction to cause data to be discarded, to the termination apparatus not capable of transmitting data within the designated time.

* * * * *